United States Patent
Rana et al.

(10) Patent No.: US 10,991,285 B2
(45) Date of Patent: Apr. 27, 2021

(54) CLOUD-BASED REMOTE DIAGNOSTICS FOR SMART SIGNAGE

(71) Applicant: Current Lighting Solutions, LLC, East Cleveland, OH (US)

(72) Inventors: Shahzil Rana, Lachine (CA); Jean-Francois Richard, Lachine (CA); Alin Ionut Petrescu, Lachine (CA); Kenneth Craig Nemeth, Lachine (CA); Truong-Khoa Nguyen, Lachine (CA); Justin Langlais, Lachine (CA)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 16/806,457

(22) Filed: Mar. 2, 2020

(65) Prior Publication Data
US 2020/0273389 A1 Aug. 27, 2020

Related U.S. Application Data

(63) Continuation of application No. 15/726,656, filed on Oct. 6, 2017, now abandoned.

(60) Provisional application No. 62/488,019, filed on Apr. 20, 2017.

(51) Int. Cl.
| | |
|---|---|
| *G09G 3/00* | (2006.01) |
| *G09G 3/32* | (2016.01) |
| *G09F 9/33* | (2006.01) |
| *G06Q 10/00* | (2012.01) |

(52) U.S. Cl.
CPC .............. *G09G 3/006* (2013.01); *G06Q 10/20* (2013.01); *G09F 9/33* (2013.01); *G09G 3/32* (2013.01); *G09G 2330/12* (2013.01); *G09G 2370/022* (2013.01)

(58) Field of Classification Search
CPC ...... G06Q 30/0241; G06Q 10/20; G09F 9/33; G09G 2330/12; G09G 2370/022; G09G 3/006; G09G 3/32
See application file for complete search history.

(56) References Cited

U.S. PATENT DOCUMENTS

| | | | | | |
|---|---|---|---|---|---|
| 6,166,496 | A | * | 12/2000 | Lys | H05B 47/18 315/316 |
| 6,292,901 | B1 | * | 9/2001 | Lys | H05B 47/18 713/300 |
| 2005/0038326 | A1 | * | 2/2005 | Mathur | A61B 5/0022 600/300 |
| 2007/0159421 | A1 | * | 7/2007 | Peker | H05B 45/37 345/82 |

(Continued)

*Primary Examiner* — Dmitriy Bolotin
(74) *Attorney, Agent, or Firm* — Buskley, Maschoff & Talwalkar LLC

(57) ABSTRACT

Provided is a method and a remote diagnostic system that can be used for signage applications that includes a plurality of LED-based signs, each having one or more corresponding LED signage drivers, one or more controllers for real-time monitoring and controlling the LEDs in the LED-based signs, a commissioning application ("app") for commissioning, the one or more controllers, an information system or cloud network for storing information received from and sending commands to, the one or more controllers related to the LED-based signs, and at least one sensor.

21 Claims, 6 Drawing Sheets

(56) References Cited

U.S. PATENT DOCUMENTS

| | | | |
|---|---|---|---|
| 2009/0093688 A1* | 4/2009 | Mathur | H04N 7/18 600/300 |
| 2009/0322800 A1* | 12/2009 | Atkins | G09G 3/3413 345/690 |
| 2010/0026190 A1* | 2/2010 | Hsu | G09G 3/14 315/130 |
| 2012/0274596 A1* | 11/2012 | Ludwig | G06F 3/042 345/173 |
| 2015/0035437 A1* | 2/2015 | Panopoulos | F21S 8/085 315/112 |
| 2015/0130351 A1* | 5/2015 | Braunstein | H05B 47/105 315/86 |
| 2015/0294603 A1* | 10/2015 | Braunstein | G09G 3/004 315/86 |
| 2016/0224306 A1* | 8/2016 | Rycyna, III | G06F 3/1446 |
| 2016/0275835 A1* | 9/2016 | Yuan | G09F 9/35 |
| 2017/0223807 A1* | 8/2017 | Recker | H02J 13/0017 |
| 2018/0227998 A1* | 8/2018 | Polychronakis | H05B 47/19 |

* cited by examiner

CLOUD-BASED REMOTE DIAGNOSTICS FOR SMART SIGNAGE

This application is a continuation of, and claims benefit of and priority to, U.S. patent application Ser. No. 15/726,656, the contents of which are hereby incorporated by reference in their entirety for all purposes.

I. TECHNICAL FIELD

The present invention relates generally to cloud-based remote diagnostic system. In particular, the present invention relates to a cloud-based remote diagnostic system for smart signage applications.

II. BACKGROUND

In many current signage systems, a user may learn of a failure in a sign only after it has occurred. Additionally, the user would only learn of this when they are on-site, for example, to view the sign. Furthermore, in many current signage systems, the user may only be able to repair a failed sign after dismantling it to diagnose the failure and identify any failed components. This process often necessitates a second trip to the sign to make any repairs or replacements.

III. SUMMARY OF THE EMBODIMENTS

Given the aforementioned deficiencies, needed is a remote diagnostic system that can be used for signage applications.

The embodiments allow users to commission, monitor, control, and maintain signage applications. The ability to diagnose and detect live data allows these users to identify and diagnose faults early and reduce repair times, as well as system down-time. The embodiments also provide the flexibility to schedule preventative maintenance. At a component level, the system provides users with an ability to identify faults down to the individual component level.

Under certain circumstances, an embodiment provides a plurality of LED-based signs, each having one or more corresponding LED signage drivers. Also included are one or more controllers for real-time monitoring and controlling the LEDs in the LED-based signs, along with a commissioning application ("app") for commissioning the one or more controllers. An information system or database, housed remotely or on a cloud platform, is configured to store information received from the one or more controllers related to the LED-based signs. At least one sensor (e.g. a camera or the like) is provided.

In other embodiments of the present invention a smart signage controller for an LED-based sign is provided. The controller is disposed within the LED-based sign, housed in a separate enclosure near the LED-based sign, or within the building the sign is attached to) and in electrical communication with a plurality of LEDs of the LED based sign. The controller is configured to monitor a status of the LEDs and control the LEDs in real-time. The controller is also configured to transmit status information to and receive instructions from a commissioning application, over a communication network (e.g., Internet, WiFi), for monitoring and controlling the LEDs of the LED-based sign. After commissioning, the controller separately communicates over the internet, for example, to the cloud network to transmit data.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

IV. DESCRIPTION OF THE DRAWINGS

Figure 1:
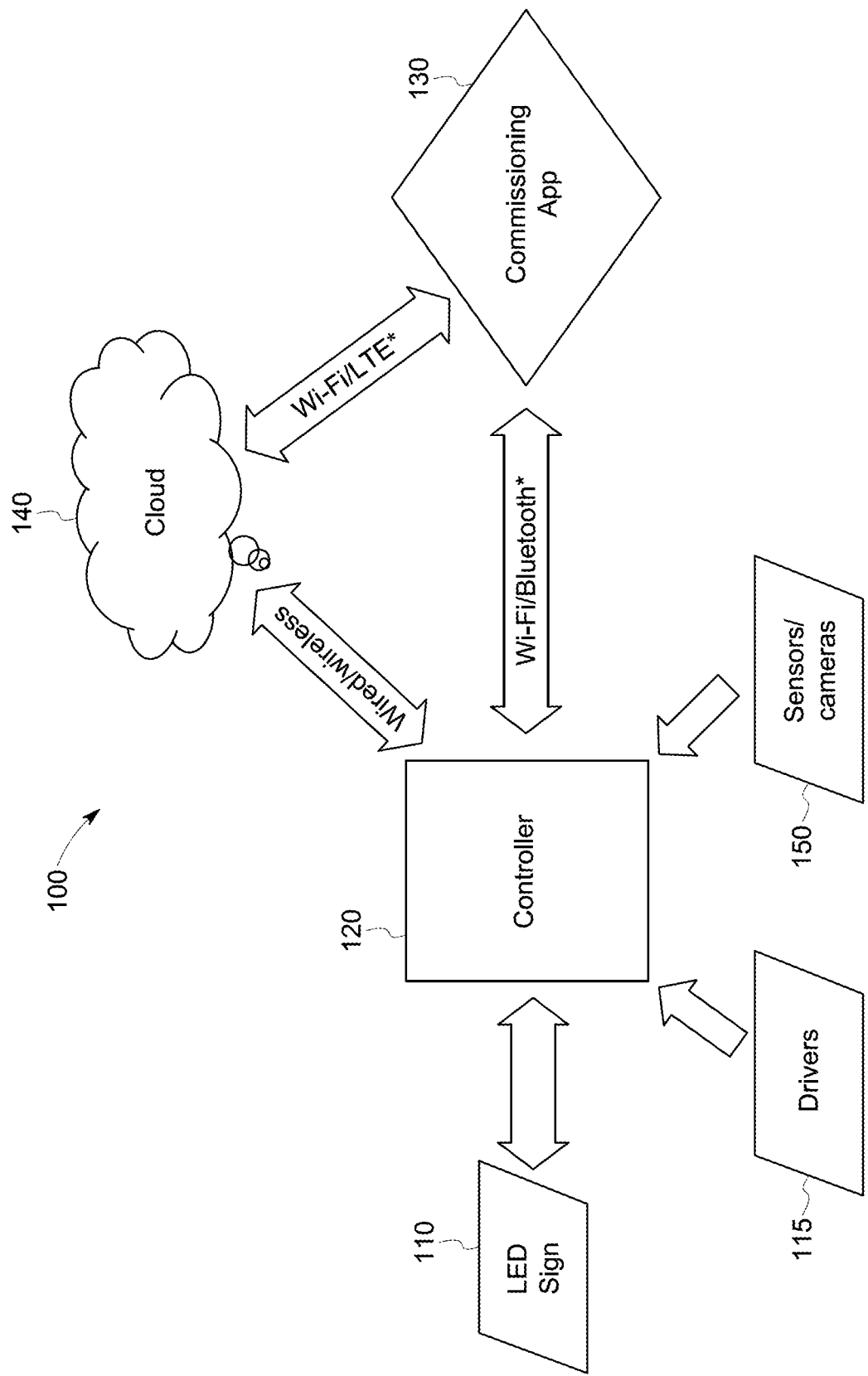
FIG. 1 is a schematic illustrating a cloud-based remote diagnostics system for signage applications that can be implemented in one or more embodiments of the present invention.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components.

In other instances, well-known components, apparatuses, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

As noted above, the embodiments provide an ability to detect, identify, and prevent faults within and an entire signage system remotely. More specifically, failure can be determined prior to arrival, such that any required replacement components can be purchased remotely, and upon diagnosis of the problem, and brought to the sign on the first trip. If the data from the signage system exhibits signs of future failure, selective preventative maintenance can also be performed.

The embodiments of the present invention include a cloud-based remote diagnostics system, as shown and described below with reference to FIGS. 1-3. The system includes a software-type commissioning application which is configured to commission a plurality of smart signage controllers within LED-based signs.

The plurality of smart signage controllers are capable of obtaining real-time ("live") parameters from a signage system, and relaying such parameters to a cloud based information system via wired and/or wireless communication. The parameters to be transmitted may include one or more of: status of LED signage driver; status of LED module in a sign; electrical parameters of an LED sign (e.g., present current, voltage, and/or power status); controller status. The parameters can also include location of a sign; elevation or height of a sign; and overall sign status. The system therefore reduces the time and costs for replacing or repairing LED-based signs within a signage system.

Figure 2:
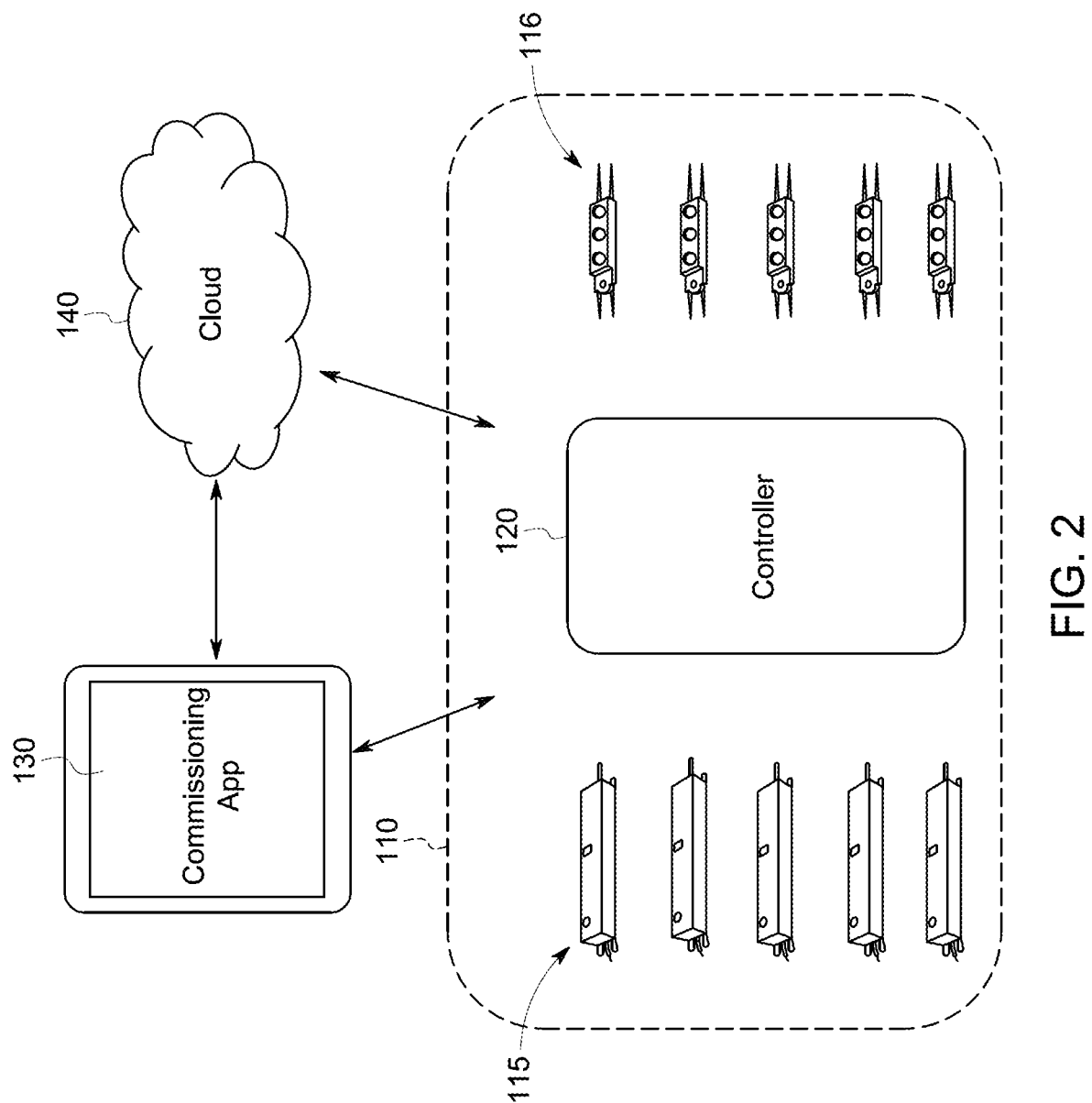
FIG. 2 is a schematic illustrating an example of an LED-based sign including a controller of the system shown in FIG. 1 that can be implemented within one or more embodiments of the present invention.

As shown in FIGS. 1 and 2, a signage system 100 includes a plurality of LED-based signs 110, each having one or more corresponding LED signage drivers 115. One or more controllers 120 provide real-time monitoring and controlling four LEDs 116 (as depicted in FIG. 2) in each LED-based sign 110. A commissioning application ("app") 130 commissions the one or more controllers 120. An information system or database, which is housed remotely or on a cloud network or platform 140, stores information received from and send commands to, the one or more controllers 120 related to the LED-based signs 110. The signage system 100 also includes at least one sensor 150 (e.g. a camera or the like).

The LED-based signs 110 can be found in the same or remote locations, spaced apart from each other. For example, one LED-based sign 110 on the system 100 can be in one state and another LED-based sign 110 can be located in a different state. That is, the LED-based signs 110 do not have to be physically co-located.

The LED-based signs 110 typically include a plurality of LEDs 116, as depicted in FIG. 2, and an associated driver 115 for driving the operation of the LEDs in each LED-based sign 110. The LED driver 115 can be designed to operate the LEDs 116 having different or same sets of electrical requirements, or any other suitable driver for the purposes set forth herein.

The commissioning application 130 initiates the monitoring and controlling of the LEDs 116 of the LED-based signs 110. The commissioning application 130 can be web-based or a browser-based interface accessible via a remote computer system e.g., a laptop, mobile device or personal computer (PC). Alternatively, according to other embodiments, the commissioning application 130 can also be an application contained completely on the device used to perform the commissioning process (e.g., an application running on a smart phone).

In accordance with the embodiments, the commissioning application 130 can enable installers of the LED-based signs 110 to connect the controller 120 to a wireless data communications connection (e.g., local WiFi connection), as well as "push" parameter information, related to the LED-based signs 110, to the controller 120. This information is pushed to the cloud-based information system on cloud network 140 or the commissioning application 130 at the user device. Separately, this information is also pushed by the commissioning application 130 to the cloud-based information system or cloud network 140.

By way of example, the commissioning application 130 can communicate with the controller(s) 120 directly over a communication network (e.g., Internet or WiFi) or via the information system on the cloud network 140. Although only one controller 120 is shown in FIG. 1, the present invention is not so limited and can include any number of controllers 120, as necessary. The number of controllers 120 corresponds to the number of LED-based signs 110.

A user can access the commissioning application 130 and send a signal to the controller 120 of each LED-based sign 110, requesting parameter information corresponding to the LED-based sign 110. Alternatively, the user can access the parameters from a user interface in the cloud network 140. The parameters to be transmitted via the controller 120, at the LED-based sign 110, can include one or more of: status of LED signage driver 115; status of LEDs 116 in an LED-based sign 110; electrical parameters of an LED-based sign 110 (e.g., present current, voltage, and/or power status); controller 120 status; location of the LED-based sign 110; elevation or height of the LED-based sign 110; and overall LED-based sign 110 status.

In the embodiments, as shown in FIG. 2, the controller 120 can be disposed within the LED-based sign 110 and in electrical communication with a plurality of LEDs 116. The controller 120 can be configured to monitor a status of the LEDs 116 and control the LEDs 116 in real-time. The controller 120 can also transmit status information to, and receive instructions from, the commissioning application 130 as depicted in FIG. 1. This communication can occur via a communication network (e.g., WiFi) or via the cloud network 140 and provides for monitoring and controlling the LEDs 116 of the LED-based sign 110.

The controller 120 can monitor and control the above-mentioned parameters and transfer related parameter data to the cloud-based information system on cloud network 140. The controller 120 can also transfer related parameter data directly to the commissioning application 130, via the cloud-based information system on cloud network 140. Details regarding the controller 120 will be discussed below with reference to FIG. 3.

Figure 3:
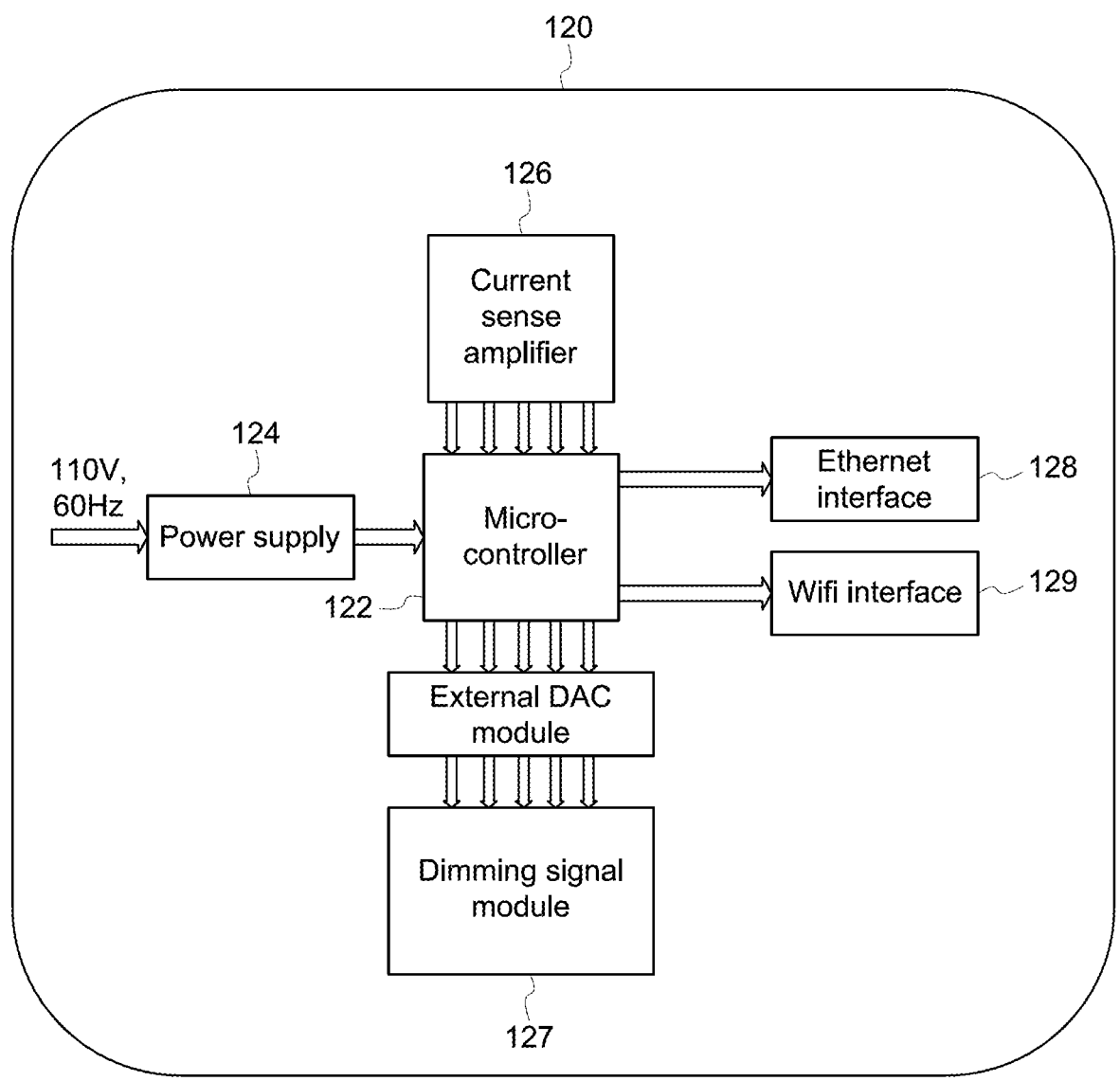
FIG. 3 is a block diagram illustrating the controller of the system shown in FIGS. 1 and 2 that can be implemented within one or more embodiments of the present invention.

FIG. 3 is a block diagram illustrating the controller of the system shown in FIGS. 1 and 2 that can be implemented within one or more embodiments of the present invention. As shown in FIG. 3, each controller 120 can comprise one or more microcontrollers 122, and an internal power supply interface 124 to be connected with the power supply of the LED-based sign 110. Each controller 120 can also include an amplifier 126, an LED dimming module 127, an Ethernet module/interface 128, a WiFi module/interface 129, or monitoring circuits (not shown). Each controller 120 can include one or more communications modules which may be implemented as, but not limited to, an Ethernet module/interface 128, WiFi module/interface 129.

The controller 120 main be connected to a plurality of sensors 150 as depicted in FIG. 1. The sensors 150 can be disposed on the controller 120, and/or external to the controller 120. The plurality of sensors 150 can include e.g., lights sensors, vibration sensors, humidity sensors, or temperature sensors to obtain further parameter information associated with the LED-based sign 110.

Figure 4:
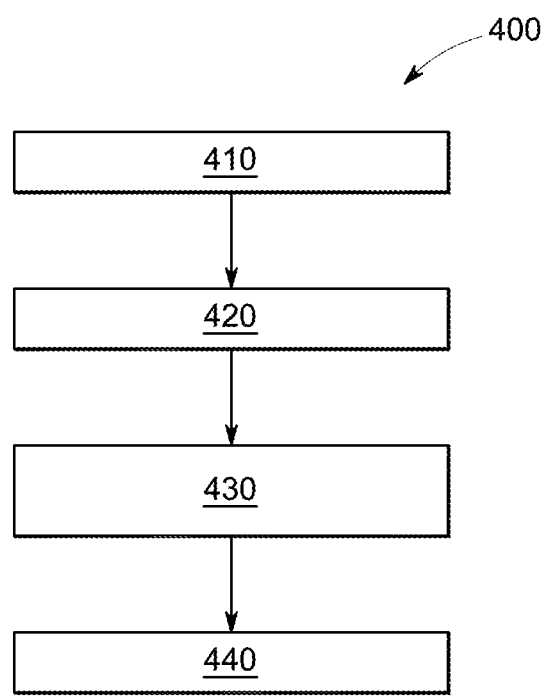
FIG. 4 is a flow diagram illustrating an exemplary method of remotely controlling an LED-based sign that can be implemented within one or more embodiments of the present invention.

FIG. 4 is a flow diagram illustrating an exemplary method 400 for remotely controlling the LED-based sign 110 within one or more of the embodiments. The method 400 begins at operation 410, where a plurality of LED-based signs are provided, each having one or more corresponding LED signage drivers. The method 400 continues at operation 420, where a commissioning application at a user device, commissions one or more controllers for monitoring and controlling the LEDs in the LED-based sign.

At operation 430, the one or more controllers perform real-time monitoring and controlling of the LEDs in the LED-based sign by sensing, via a sensor in communication with the one or more controllers, status information of the LEDs. From operation 430, the process continues to operation 440 where the status information is transmitted to the information system or cloud database which is housed remotely or on the cloud network, and/or directly to the commissioning application at the user device.

The system 100 can provide a user with diagnostics on the condition of a signage system. The system 100 can also identify one or more faults in the signage that may occur throughout its lifecycle, an example of which is depicted in FIG. 5.

Figure 5:
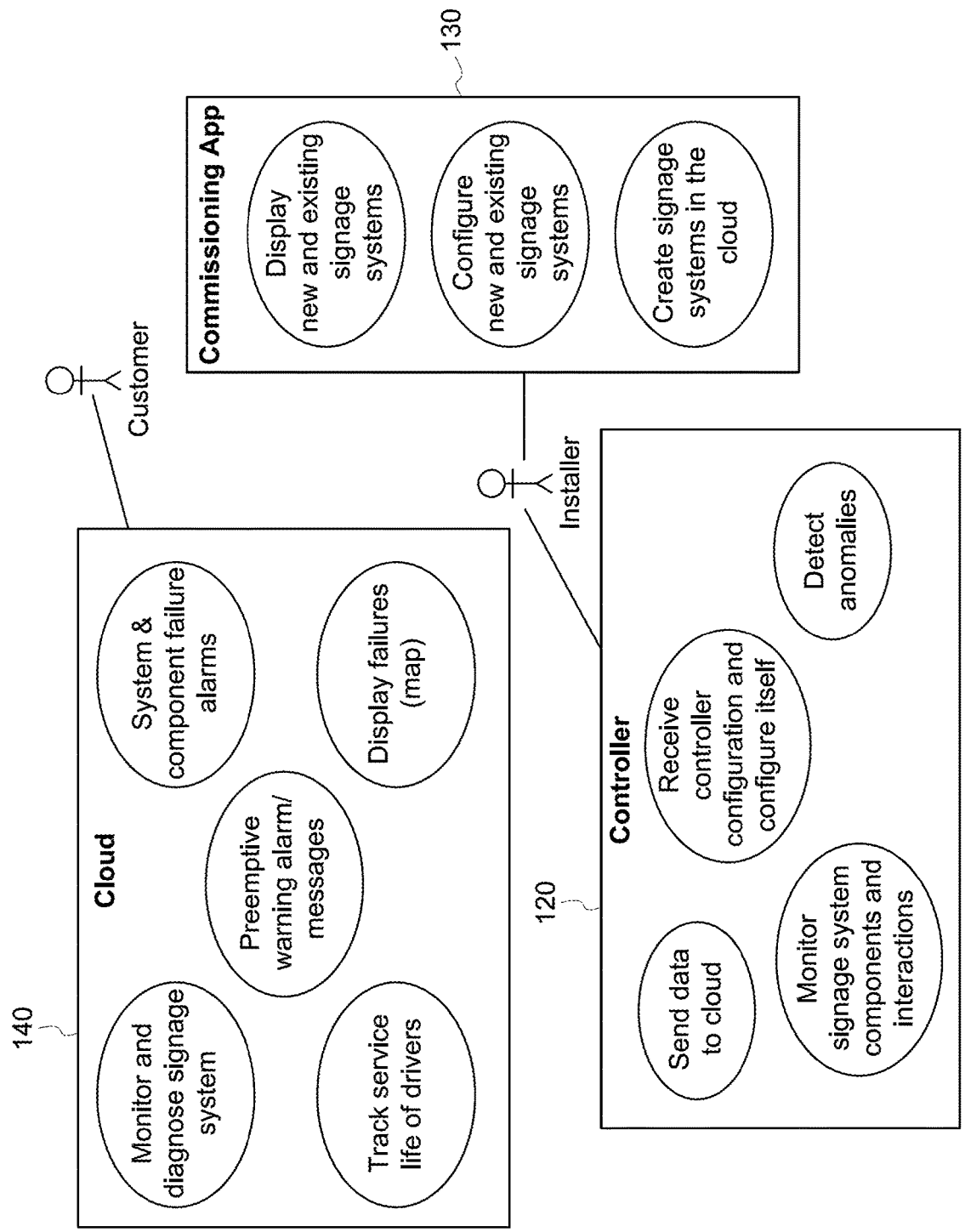
FIG. 5 is a schematic illustrating an example of use of the system of FIG. 1 that can be implemented within one or more embodiments of the present invention.

FIG. 5 is a schematic illustrating an example of use of the system 100 of FIG. 1, implementable within the embodiments. As shown in FIG. 5, at the commissioning application 130, an installer can display and configure new and existing signage systems and create a digital representation of signage systems in the cloud. The cloud-based information system on the cloud network 140, can monitor and diagnose the signage systems.

The cloud-based information system on the cloud network 140 can also track service of life of the LED drivers 115, display failures via a map, issue system and/or component failure alarms and other preemptive warnings/alarm messages. For example, the system can issue warnings based on historical failure data obtained via the controllers 120 at the LED-based signs 110.

The controllers 120 can detect anomalies, monitor the signage system components and monitor interactions with other components. The controllers 120 can also receive controller configuration and reconfigure themselves and send the parameter information to the cloud-based information system and/or the cloud network. As such, the system 100 is able to perform diagnostics on the data obtained from the controllers 120, such as faults in the LED-based signs 110.

These faults can include, but are not limited to, one or more of LED light intensity, LED driver failure, LED module failure, electric shock hazard, potential fire, ice/snow build-up, flashing sign, extreme wind, or earthquake detection; or the like. Once diagnostics have been performed, a user of the system 100 may then be notified of a complete status of the signage system. In the embodiments, such notifications may be configurable, and may be in the form of text message, e-mail, web report, or visual indicators, or the like.

As understood by persons of skill in the art, any relevant data communications can be performed by many suitable configurations and protocols, wireless and/or wired. Wireless communication may comprise one or more of Bluetooth, Wi-Fi, LTE, ZigBee, 6 lowpan; or the like. Wired communication may comprise one or more of Ethernet or Fibre Optics, or the like.

Additional detailed examples of operations performed via the controller 120, commissioning application 130, the cloud network 140 of the system 100 are described below with reference to FIG. 6.

Figure 6:
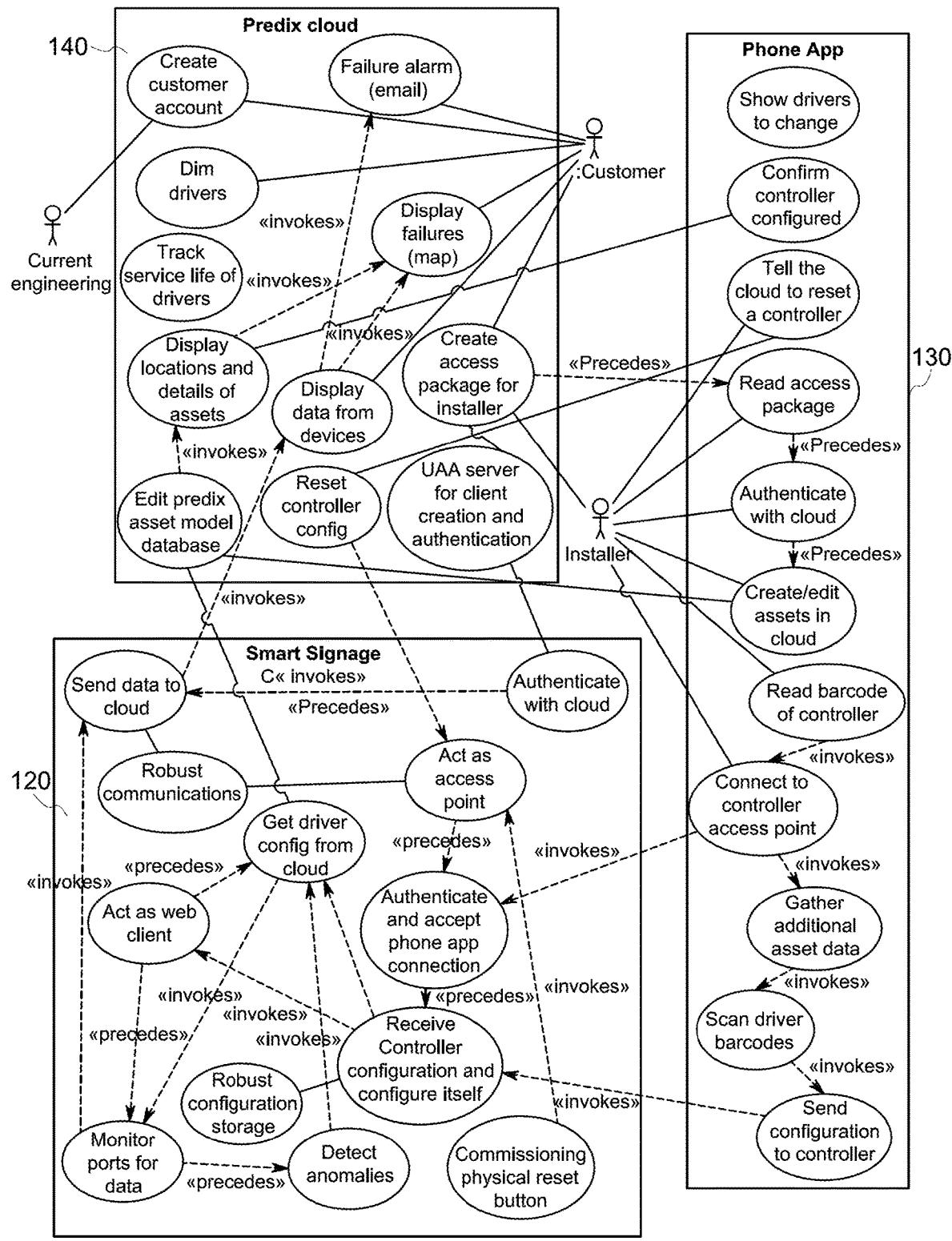
FIG. 6 is a schematic illustrating a detailed example of usage of the system of FIG. 1 that can be implemented within one or more embodiments of the present invention.

FIG. 6 is a schematic illustrating a detailed example of usage of the system of FIG. 1 in accordance with the embodiments. As shown in FIG. 6, the controller 120 can further obtain driver configuration information from the cloud network 140. The controller 120 can also authenticate with the cloud and authenticate/accept the commissioning (e.g., phone) application connection. Additionally, it can act as a web client, monitor ports for data, and commission a physical reset button. The commissioning reset button resets the controller 120 to a factory state when pressed. The controller 120 can also include a configuration storage.

Further, the commissioning application 130 can illustrate drivers 115 to be changed, confirm controller configuration, and tell the information system on the cloud network 140 to reset the controller 120. The commissioning application 130 can also authenticate with the cloud system or network 140, create/edit assets in the information system on the cloud network 140, read controller information (e.g., barcode info), scan driver 115 barcodes, and send driver 115 configuration to the controller 120.

The cloud system or network 140 can create customer accounts, display locations and details of the LED-based signs 110 (i.e., assets), reset controller configuration, perform client creation and authentication, track service life of drivers and perform dimming of the LEDs 116 via the drivers 115. The controller 120 dims the LEDs 116 based on the dimming schedule. The dimming schedule may be pre-configured on the device or it may be received from the cloud network 140 or commissioning application 130.

In accordance with the embodiments, the present invention can permit a user to commission, monitor, control, and maintain signage applications. Generally, an ability to diagnose and detect live data would allow users to identify faults at an appropriate time, in order to reduce time needed to repair, as well as potentially reduce system down-time. Having such an ability may provide flexibility to schedule preventative maintenance. Furthermore, the disclosed system may provide its user with an ability to identify faults down to the individual component; for example, a fault in an individual LED signage driver in a given sign.

One possible technical advantage includes the ability to detect, identify, and prevent faults within an entire signage system, from a location which is remote from the signs. The present disclosure may allow a failure to be determined prior to arrival of a technician, such that the required replacement components can be purchased immediately and brought to the site of failure on the first trip of the technician. If the data from the signage system shows signs of future failure, selective preventative maintenance is also now an option.

This written description uses examples to disclose the invention including the best mode, and also to enable any person skilled in the art to practice the invention, including making and using any devices or apparatuses and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A remote diagnostic system for signage applications, the system comprising:
   one or more light emitting diode-based signs comprising a plurality of light emitting diodes, each having one or more corresponding light emitting diode signage drivers;
   one or more controllers configured to perform at least one of (i) real-time monitoring and (ii) controlling the light emitting diodes in the light emitting diode-based signs;

a commissioning application configured to commission the one or more controllers;

an information system in a cloud network, for storing information received from the one or more controllers and the commissioning application, related to the one or more light emitting diode-based signs; and one or more sensors in communication with the one or more controllers to sense parameter information of the one or more light emitting diode-based signs, wherein the parameter information comprises a status of at least one of the one or more light emitting diode signage drivers, and wherein the one or more controllers are configured to detect a fault in the at least one light emitting diode signage driver based upon the parameter information;

wherein the commissioning application is further configured to allow a user to authenticate the commissioning application with the information system and to create a digital representation of a signage system including the one or more light emitting diode-based signs and the one or more controllers in the information system.

2. The system of claim 1, wherein the light emitting diode-based signs are in different physical locations and the digital representation of the signage system includes information usable to identify the different physical locations.

3. The system of claim 1, wherein the commissioning application is web-based.

4. The system of claim 1, wherein the commissioning application is browser-based interface accessible via a remote computer system.

5. The system of claim 4, wherein the commissioning application is an application running natively on the remote computer system.

6. The system of claim 1, wherein a user accesses the commissioning application and the commissioning application transmits a signal to the one or more controllers requesting the parameter information corresponding to the one or more light emitting diode-based signs.

7. The system of claim 6, wherein the parameter information further comprises one or more of status of the light emitting diodes, electrical parameters of an light emitting diode-based signs, status of the one or more controllers, location of the one or more light emitting diode-based signs, elevation or height of the one or more light emitting diode-based signs, and overall operational status of the one or more light emitting diode-based sign.

8. The system of claim 1, wherein a user accesses the cloud network to view details and parameter information received from the one or more controllers in the LED-based signs, wherein the information is pushed to the information system on the cloud network from the one or more controllers and the commissioning application.

9. The system of claim 1, wherein the one or more controllers are disposed within the one or more light emitting diode-based signs and in electrical communication with the plurality of light emitting diodes, and configured to: (i) monitor a status of the light emitting diodes and control the light emitting diodes in real-time, and (ii) transmit status information to and receive instructions from the commissioning application over the cloud network.

10. The system of claim 9, wherein each controller of the one or more controllers comprises:

one or more microcontrollers;

an internal power supply interface to be connected with the power supply of the one or more light emitting diode-based signs; and at least one communication network.

11. The system of claim 10, wherein the at least one communication network comprises at least one of an ethernet interface and a wireless network interface.

12. The system of claim 10, wherein the one or more sensors are disposed within each one or more controllers and connected thereto.

13. The system of claim 10, wherein the one or more sensors are external to each one or more controllers and connected thereto.

14. The system of claim 10, wherein the one or more sensors comprises one or more of lights sensors, vibration sensors, humidity sensors, or temperature sensors to obtain further parameter information associated with the light emitting diode-based signs.

15. A controller for a light emitting diode sign, the controller being disposed within or adjacent to the light emitting diode-based sign and in electrical communication with a plurality of light emitting diodes thereof, and configured to:

(i) monitor a status of the light emitting diodes and control the light emitting diodes in real-time, each of the light emitting diodes having one or more corresponding light emitting diode signage drivers, and (ii) transmit parameter information to and receive instructions from a commissioning application, over a cloud network, for monitoring and controlling the light emitting diodes of the light emitting diode-based sign, wherein the parameter information comprises a status of at least one of the plurality of light emitting diodes, and wherein the controller is further configured to detect a fault associated with the at least one light emitting diode based upon the parameter information, wherein the commissioning application is authenticated with an information system.

16. The controller of claim 15, wherein a user accesses the commissioning application and the commissioning application transmits a signal to the controller requesting the parameter information corresponding to the light emitting diode-based sign.

17. The controller of claim 16, wherein the parameter information further comprises one or more of status of the light emitting diodes, electrical parameters of an light emitting diode-based signs, status of the one or more controllers, location of the one or more light emitting diode-based signs, elevation or height of the one or more light emitting diode-based signs, and overall operational status of the one or more light emitting diode-based sign.

18. The controller of claim 17, wherein the controller comprises:

one or more microcontrollers;

an internal power supply interface to be connected with the power supply of the one or more light emitting diode-based signs; and at least one communication interface.

19. The controller of claim 18, wherein the controller further comprises a sensor sensing the parameter information of the light emitting diode-based sign.

20. The controller of claim 19, wherein the controller interfaces with a sensor sensing the parameter information wherein the sensor is external to the controller and connected thereto.

21. A method for remotely controlling a light emitting diode-based sign over a cloud network, the method comprising:

providing a one or more light emitting diode-based signs, each having one or more corresponding light emitting diode signage drivers;

commissioning, via a commissioning application, one or more controllers for monitoring and controlling the light emitting diodes in the light emitting diode-based signs, the commissioning application configured to allow a user to authenticate the commissioning application with an information system;

performing, via the one or more controllers, at least one of (i) real-time monitoring and (ii) controlling of the light emitting diode-based signs;

sensing, via one or more sensors in communication with the one or more controllers, parameter information of the light emitting diodes, and transmitting the parameter information to the information system or database which is housed remotely or on a cloud network for storing the information from the one or more controllers and to the commissioning application, wherein the parameter information comprises a status of at least one of the one or more light emitting diodes, and detecting a fault associated with the at least one light emitting diode based upon the parameter information.

* * * * *